US011455705B2

(12) United States Patent
Banerjee et al.

(10) Patent No.: US 11,455,705 B2
(45) Date of Patent: Sep. 27, 2022

(54) ASYNCHRONOUS SPACE WARP FOR REMOTELY RENDERED VR

(71) Applicant: QUALCOMM Incorporated, San Diego, CA (US)

(72) Inventors: Sudipto Banerjee, Kolkata (IN); Vinay Melkote Krishnaprasad, Bangalore (IN); Pawan Kumar Baheti, Bangalore (IN); Ajit Venkat Rao, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 16/417,483

(22) Filed: May 20, 2019

(65) Prior Publication Data

US 2020/0104975 A1 Apr. 2, 2020

(30) Foreign Application Priority Data

Sep. 27, 2018 (IN) .............................. 201841036547

(51) Int. Cl.
*G06T 3/00* (2006.01)
*G06T 7/55* (2017.01)
*G06T 7/246* (2017.01)

(52) U.S. Cl.
CPC ............ *G06T 3/0093* (2013.01); *G06T 7/248* (2017.01); *G06T 7/55* (2017.01); *G06T 2207/10028* (2013.01)

(58) Field of Classification Search
CPC ......... G06T 3/0093; G06T 7/55; G06T 7/248; G06T 2207/10028
See application file for complete search history.

(56) References Cited

U.S. PATENT DOCUMENTS 8,854,425 B2* 10/2014 Varekamp ............... G06T 5/005
348/42
8,896,715 B2* 11/2014 Wu .................... H04N 21/4223
348/208.6

(Continued)

FOREIGN PATENT DOCUMENTS

EP 3522150 A2 8/2019

OTHER PUBLICATIONS

Beeler D., et al., "Asynchronous Spacewrap | Oculus", Oculus Developer Blog, Nov. 10, 2016, XP055641235, Retrieved from the Internet: URL: https://developer.oculus.com/blog/asynchronous-spacewrap/ [retrieved on Nov. 11, 2019] p. 1, 1.para. Sec. "What is this Sorcery?" on p. 2.

(Continued)

*Primary Examiner* — Ryan R Yang
(74) *Attorney, Agent, or Firm* — Campbell C. Chiang; Procopio, Cory, Hargreaves & Savitch LLP

(57) ABSTRACT

The present disclosure relates to methods and apparatus for graphics processing. In some aspects, the apparatus may receive, by a first device from a second device, first position information corresponding to a first orientation of the second device. The apparatus can also generate, by the first device, first graphical content based on the first position information. Further, the apparatus can also generate, by the first device, motion information for warping the first graphical content. The apparatus can also encode, by the first device, the first graphical content. Additionally, the apparatus can provide, by the first device to the second device, the motion information and the encoded first graphical content.

22 Claims, 14 Drawing Sheets

(56) References Cited

U.S. PATENT DOCUMENTS

| | | | |
|---|---|---|---|
| 2010/0182511 A1* | 7/2010 | Xu | G06T 3/4053 348/699 |
| 2011/0317766 A1* | 12/2011 | Lim | H04N 19/597 375/240.16 |
| 2013/0265499 A1* | 10/2013 | Knee | H04N 19/80 348/699 |
| 2015/0189253 A1* | 7/2015 | Tu | G06T 5/005 348/43 |
| 2016/0266661 A1* | 9/2016 | Forsblom | G06F 3/04815 |
| 2017/0039926 A1 | 2/2017 | Greer, III | |
| 2017/0103577 A1 | 4/2017 | Mendhekar et al. | |
| 2017/0155885 A1 | 6/2017 | Selstad et al. | |
| 2017/0243403 A1 | 8/2017 | Daniels et al. | |
| 2018/0040133 A1 | 2/2018 | Srinivasan et al. | |
| 2018/0043247 A1 | 2/2018 | Vandonkelaar | |
| 2018/0053284 A1* | 2/2018 | Rodriguez | G06T 3/0093 |
| 2018/0075654 A1 | 3/2018 | Vembar et al. | |
| 2018/0220156 A1* | 8/2018 | Kim | G06T 3/0093 |
| 2018/0357809 A1* | 12/2018 | Lawless | G06T 1/20 |
| 2019/0037244 A1 | 1/2019 | Melkote Krishnaprasad et al. | |
| 2019/0183444 A1* | 6/2019 | Castillo | A61B 6/5217 |
| 2019/0333263 A1 | 10/2019 | Melkote Krishnaprasad et al. | |
| 2019/0340462 A1* | 11/2019 | Pao | G06T 3/4053 |
| 2020/0029071 A1* | 1/2020 | Kang | H04N 19/159 |
| 2020/0058152 A1* | 2/2020 | Zhang | G06F 3/012 |

OTHER PUBLICATIONS

Partial International Search Report—PCT/US2019/050257—ISA/EPO—dated Dec. 6, 2019.

Smit F.A., et al., "A Programmable Display Layer for Virtual Reality System Architectures," IEEE Transactions on Visualization and Computer Graphics, IEEE Service Center, Los Alamitos, CA, US, vol. 15 (1), Jan. 1, 2010, pp. 28-42, XP011294513, ISSN: 1077-2626, Sec. 1, 1.para. Fig. 3 and 4, Sec. 3.1, 1 and 2 para.

International Search Report and Written Opinion—PCT/US2019/050257—ISA/EPO—dated Jan. 28, 2020.

* cited by examiner

ASYNCHRONOUS SPACE WARP FOR REMOTELY RENDERED VR

CROSS REFERENCE TO RELATED APPLICATIONS

This application claims the benefit of Indian Provisional Application No. 201841036547, entitled "ASYNCHRONOUS SPACE WARP FOR REMOTELY RENDERED VR" and filed on Sep. 27, 2018, which is expressly incorporated by reference herein in its entirety.

TECHNICAL FIELD

The present disclosure relates generally to processing systems and, more particularly, to one or more techniques for graphics processing in processing systems.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a first apparatus are provided. The apparatus may be a graphics processing unit (GPU). In some aspects, the apparatus may be configured to receive, by a first device from a second device, first position information corresponding to a first orientation of the second device. The apparatus may also be configured to generate, by the first device, first graphical content based on the first position information. Additionally, the apparatus may be configured to generate, by the first device, motion information for warping the first graphical content. The apparatus may further be configured to encode, by the first device, the first graphical content. Also, the apparatus may be configured to provide, by the first device to the second device, the motion information and the encoded first graphical content.

In another aspect of the disclosure, a method, a computer-readable medium, and a first apparatus are provided. The apparatus may be a GPU. In some aspects, the apparatus may be configured to provide, by a first device to a second device, first position information corresponding to a first orientation of the first device. The apparatus may also be configured to receive, by the first device from the second device, encoded first graphical content generated based on the first position information. Further, the apparatus may be configured to receive, by the first device from the second device, motion information. The apparatus may be configured to decode, by the first device, the encoded first graphical content to generate decoded first graphical content. Also, the apparatus may be configured to warp, by the first device, the decoded first graphical content based on the motion information.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
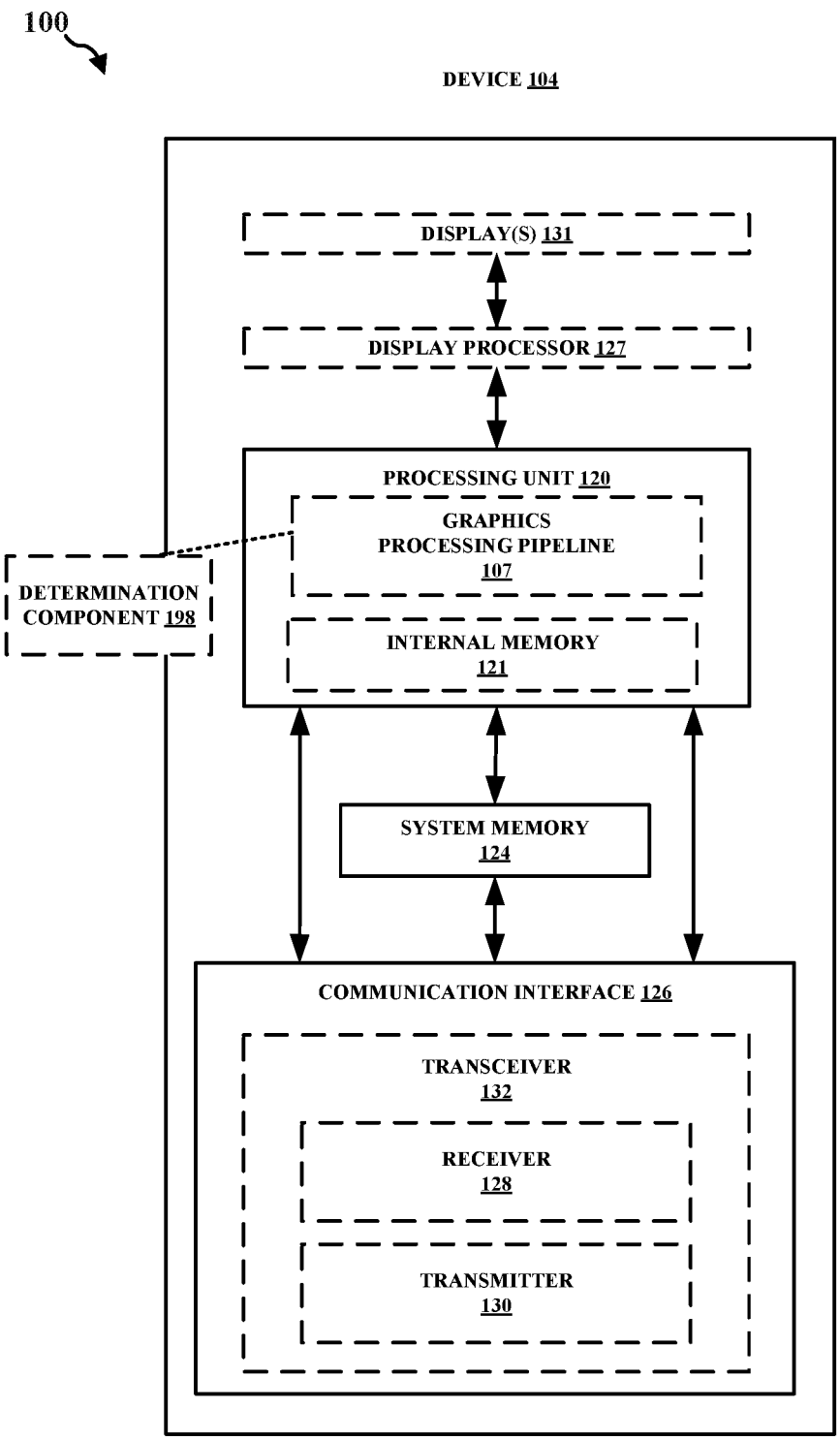
FIG. 1 is a block diagram that illustrates an example content generation and coding system in accordance with the techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

As used herein, instances of the term "content" may refer to graphical content or display content. In some examples, as used herein, the term "graphical content" may refer to a content generated by a processing unit configured to perform graphics processing. For example, the term "graphical content" may refer to content generated by one or more processes of a graphics processing pipeline. In some examples, as used herein, the term "graphical content" may refer to content generated by a graphics processing unit. In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120, such as system memory 124, may be accessible to the processing unit 120. For example, the processing unit 120 may be configured to read from and/or write to external memory, such as the system memory 124. The processing unit 120 may be communicatively coupled to the system memory 124 over a bus. In some examples, the processing unit 120 may be communicatively coupled to each other over the bus or a different connection.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to receive first position information corresponding to a first orientation of a first device. The determination component 198 can also be configured to generate first graphical content based on the first position information. Additionally, the determination component 198 can be configured to generate motion information for warping the first graphical content. The determination component 198 can also be configured to encode the first graphical content. Moreover, the determination component 198 can be configured to provide the motion information and the encoded first graphical content, e.g., by the first device to a second device.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein.

In remotely rendered virtual reality (RVR) and other gaming applications, there is a server or game engine which generates content and a device or client which performs according to the content. In some instances, the client can send a pose to a sever, and the server can transmit frames back to client. In some of these instances, by the time the server sends a frame back to the client, the client may have already moved on to another pose. This can make predicting movements at the client side difficult. In some aspects, the game engine or server may render an eye-buffer frame based on a head pose received from head-tracking components in the client or head mounted device (HMD), and transmit this frame back to the HMD for display.

Techniques such as asynchronous time warp (ATW) can be used to warp the eye-buffer to the current pose of the HMD, which thereby can reduce perception of latency or judder, e.g., shaking or vibration. However, in some instances, this may work well only on static scenes. In some aspects, whenever the client gets the frame back from the server, the client may try to predict future content by aligning the received frame with the correct pose. This can reduce latency experienced at the client side. Asynchronous space warp (ASW) may overcome the limitations of ATW by additionally extrapolating segments with motion in the eye-buffer to an updated location based on motion vectors. By doing so, this can further reduce judder on moving objects. Additionally, motion vectors may be utilized to reduce judder by predicting how objects will move.

Figure 2:
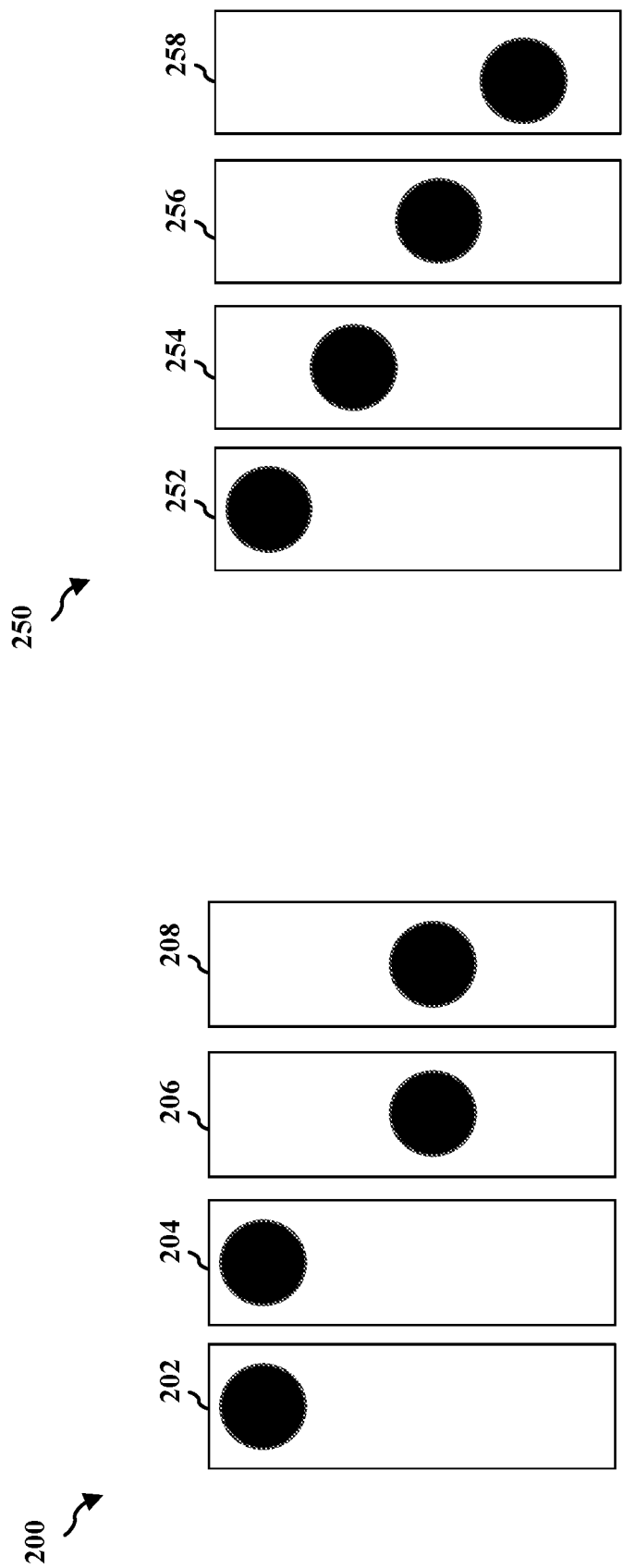
FIGS. 2A and 2B illustrate examples of warping techniques according to the present disclosure.

FIGS. 2A and 2B illustrate examples of warping techniques 200 and 250 according to the present disclosure. For instance, ATW can smooth head-tracking rendering, but inter-frame animations may have judder. ASW can smooth both head-tracking and object animations. For example, FIGS. 2A and 2B illustrate the difference between ATW and ASW in a scene where a ball is dropping vertically with constant velocity with no camera or head motion. Using ATW, frames can be rendered at 30 Hz, e.g., frames 202 and 206) and used to warp to display poses, e.g., frames 204 and 208). In this example, given that there may be no camera motion, ATW may result in the displayed frame being a simple copy of the last received frame, which can result in a stutter in sequence. ASW can help to smooth the object motion and display minimal stutter, e.g., as shown in frames 252, 254, 256, and 258. ASW can also use accurate motion vectors generated by game engine to help understand the motion of objects. For instance, in a split rendering scenario, motion vectors are transmitted for a grid of points overlaid on a rendered frame. In some aspects, the displayed frame in ASW may be obtained by warping the last received by extrapolating motion vectors.

Figure 3:
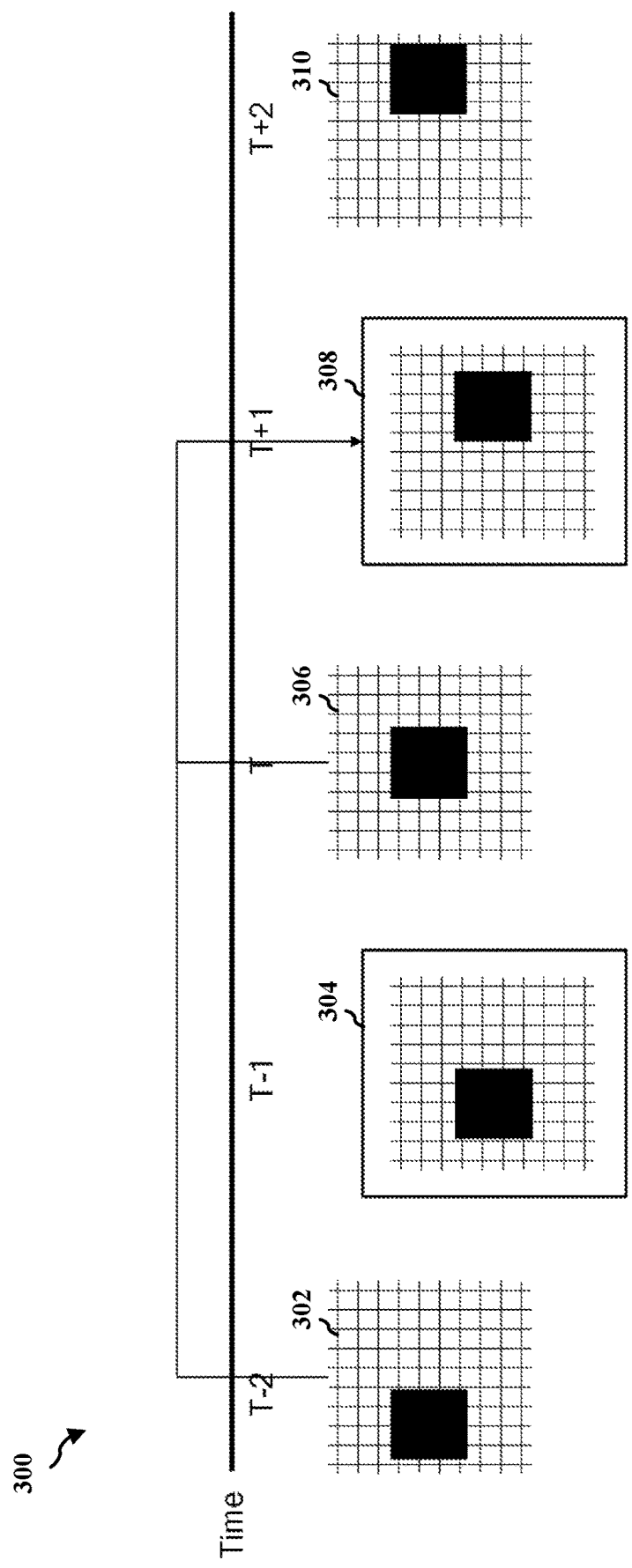
FIG. 3 illustrates another example of a warping technique according to the present disclosure.

FIG. 3 illustrates an example of an ASW technique 300 according to the present disclosure. In the example shown in FIG. 3, a foreground object is moving toward the right in a scene with stationary textured background, e.g., as shown in frames 302, 304, 306, 308, and 310 at times T−2, T−1, T, T+1, and T+2, respectively. In the scene, the camera is stationary, e.g., there is no rotation or translation. Also, frames may be rendered by game engine or server at 30 frames-per-second (FPS). The ASW at the client can generate frames "in-between" to up-sample the FPS by two times. Accordingly, the resulting frames can be displayed at 60 FPS. In order to accomplish this, ASW can use motion vectors of the scene and extrapolate them to the display pose. The extrapolated motion vectors help to denote where the object would be had the frame been rendered.

Figure 4B:
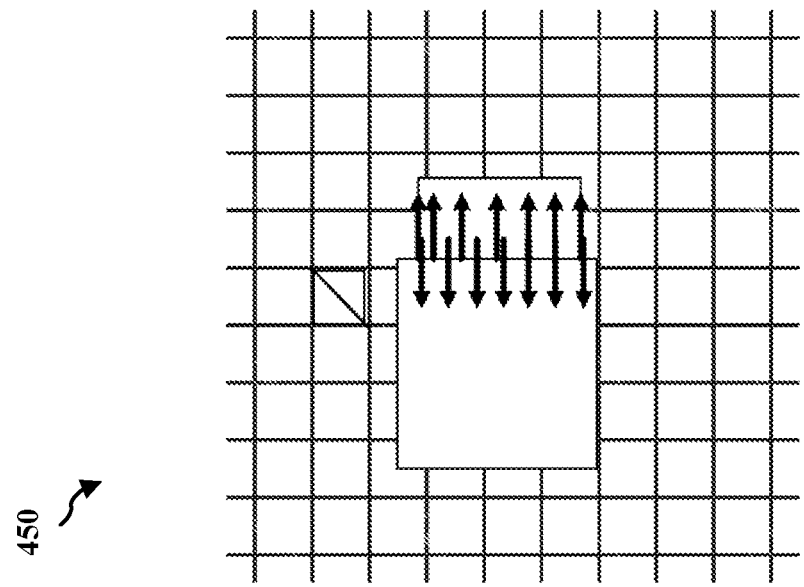
FIGS. 4A and 4B illustrate other examples of warping techniques according to the present disclosure.
Figure 4A:
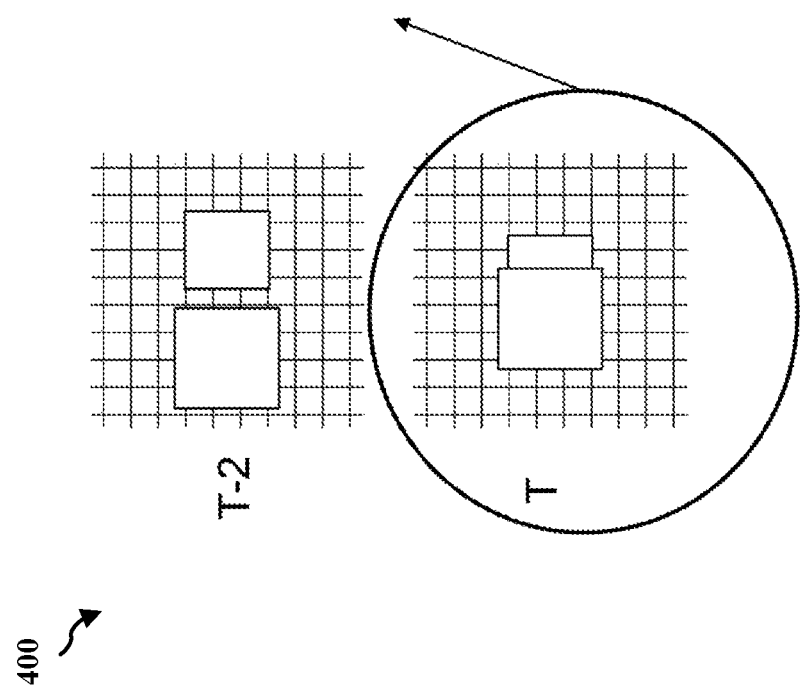

FIGS. 4A and 4B illustrate examples 400 and 450, respectively, illustrating issues that may arise when applying ASW techniques to graphical content according to the present disclosure. More specifically, FIGS. 4A and 4B show one example of an artifact of traditional ASW techniques. The artifacts look like z-fighting, which can occur in graphical content when rendering two or more objects at a similar depth relative to the camera. For example, as shown in FIG. 4A, a foreground object moving towards the right and background object moving towards the left, both against a static textured background, may produce z-fighting-like artifacts. In this example, the camera can be static. In some aspects, a set of sampled grid points can be considered and only the motion vectors at the sampled locations are used to extrapolate the display pose, e.g., certain grid points. Extrapolated motion vectors on neighboring sampled points may lie on objects with opposing motion, which means the extrapolated motion vectors are conflicting. As shown in FIG. 4B, the opposing motion vectors can cause triangles to overlap on top of one another during warping. For example, each grid square is divided into two triangles, and triangles can be warped and shaded using a fragment shader on the client GPU. Since the client may only have video frames and motion vectors, but no depth data, the client GPU may not differentiate between the foreground and background. As such, this can cause the GPU to warp triangles in the order they are processed. This can be referred to as a z-fighting-like artifact.

Figure 5:
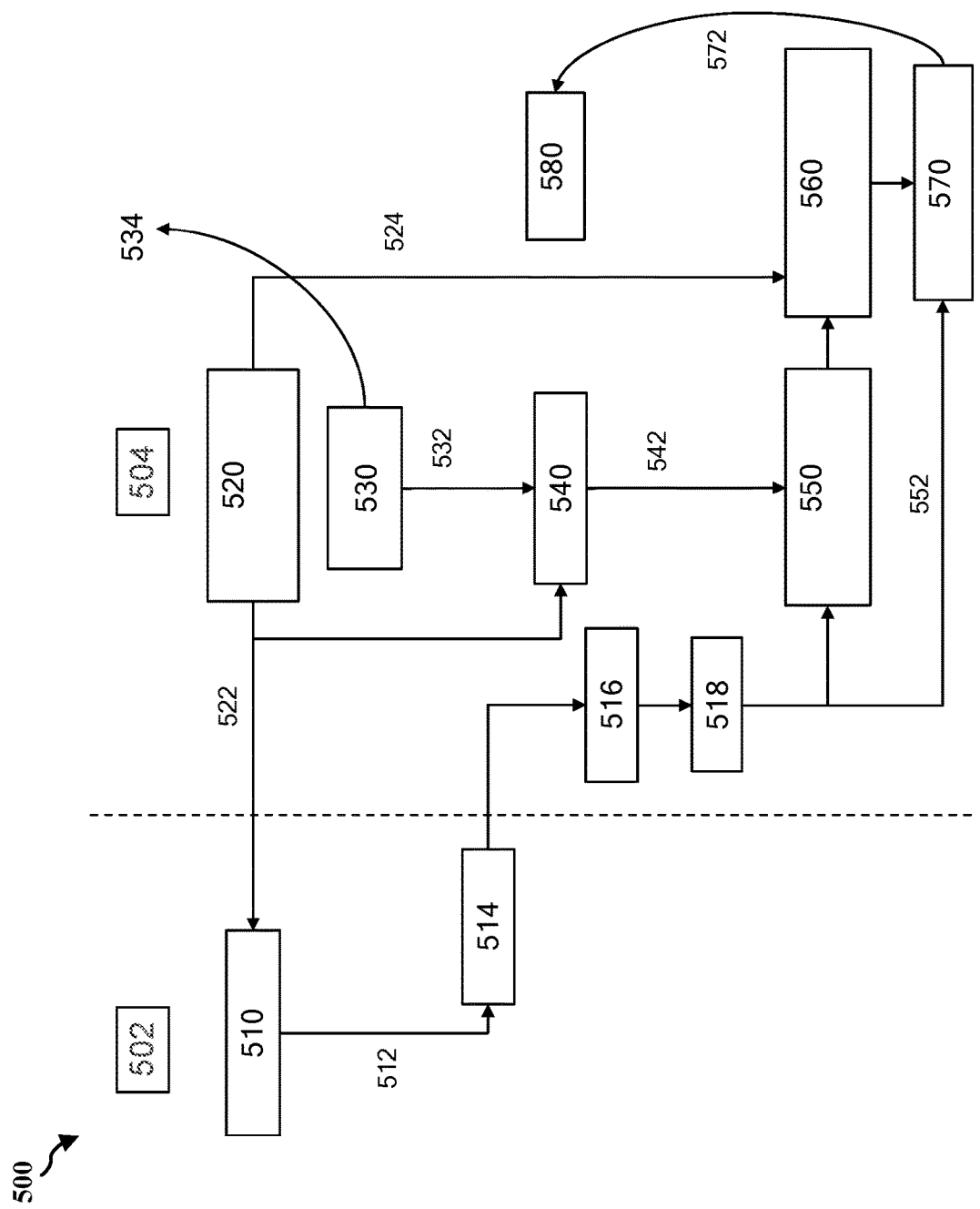
FIG. 5 illustrates an example of a content generation and coding system in accordance with the techniques of this disclosure.

FIG. 5 illustrates an example of a content generation and coding system 500. More specifically, FIG. 5 shows one example of a conventional ASW generation and coding system that relies on motion vector generation at the client side. As shown in FIG. 5, system 500 includes server 502 and client 504. Server 502 includes renderer 510 and encoder 514. Client 504 includes decode unit 516, decoded frame 518, head tracking system 520, buffer 530, ATW unit 540, motion vector computation unit 550, motion vector filtering and extrapolation unit 560, warping unit 570, and display 580. System 500 also includes rendered frame 512, pose 522, latest pose 524, previous frame and pose 532, e.g., previously rendered frame and corresponding pose 534 stored in buffer 530, previous frame aligned to rendered pose 542, engine 552, e.g., venus engine, and warped frame 572.

In the example in FIG. 5, the server 502 can generate an eye-buffer corresponding to received pose 522 and transmit the frame to the HMD or client 504. The client 504 can store previously rendered poses and frames in a buffer 530. In some instances, the ATW unit 540 can align previous frames to rendered poses and motion vectors between received frames and aligned previous frames may be computed at the client on a grid of points. Since the client 504 may not have geometry information regarding the scene, the motion vectors may be determined by computer algorithms that can compare the current received frame and previous received frames, i.e., by image comparison. In some aspects, the previously decoded frames are stored upon which the motion vectors can be calculated. Since the current pose for the displayed frame may be different from the pose for the last received frame, the motion vectors can be extrapolated to the current pose. Further, computed grid motion vectors can be filtered and extrapolated for the latest display pose and applied to a vertex grid on a received frame. The extrapolated vertices can also be multiplied using homography to align with the latest display pose. Also, the fragment shader can create the final displayed frame, which can occur on the client end.

Motion vectors may be generated by computer algorithms that compare the last received frame and previously aligned frames via patch matching or optical flow, which may not be reliable for complex scenes. For instance, spurious patch matches in sparsely-textured regions or regions with repetitive patterns might produce incorrect motion vectors. This can cause object distortion and judder near the edges of the objects. For example, if warping is accomplished using incorrect motion vectors, an incorrect or distorted object can be produced. Use in real time applications can prohibit a computer or computing engine from using sophisticated methods for motion vector computation. In ASW, there may only be information about the motion of different regions in the frame, so there may be no notion of depth or foreground and background. When the motion is such that a foreground object slides over its background, in some instances ASW may not be able to resolve the resulting occlusion. So in the process of warping triangles, if the foreground lands on top of the background, but some other triangles in the background end up in the front, then depending on the order of the GPU handles them, this can cause z-fighting-like artifacts, as mentioned supra. The aforementioned z-fighting-like artifacts can be avoided if the motion vectors are smoothed using a 2D-filter, so that large differences in motion vectors between adjacent vertices can be reduced. For example, z-fighting-like artifacts can be eliminated by filtering. However, filtering can result in spreading the motion of moving objects to neighboring regions that are supposed to be stationary. The result of this can be stretching and deformation.

In addition, the size of the aforementioned grid can also affect the foreground object distortions, e.g., comparing a 16×16 grid with a 4×4 grid. As the grid size is decreased, the z-fighting artifacts can also decrease, but the stretching may correspondingly increase. Larger grid sizes can cause more noticeable distortion compared to smaller grid sizes, but result in a considerable reduction of z-fighting-like artifacts. On the other hand, smaller grid sizes can reduce object distortion or stretching, but increase z-fighting-like artifacts. The reason for this is that smaller grid sizes can mean stretching is limited to the small grid area, but also that overlapping occurs across a higher number of triangles.

As mentioned herein, ASW methods that may be solely executed on the HMD or client side, i.e., if the motion vector generation, filtering, and utilization for vertex extrapolation all occurs on the HMD, the quality of warp may be limited by computational complexity. Further, a suboptimal choice of filters, motion vectors, and lack of depth can result in distortion, residual judder, and z-fighting artifacts. As the client side usually runs the game or program in real time, some aspects of the present disclosure can compute motion vectors at the server side. Some aspects of the present disclosure can utilize an efficient architecture for ASW in the RVR context, where the choice of parameters that influence the warp quality (e.g., motion vectors, grid size, filter kernel) may be determined optimally via complex operations implemented on the server end. This can help the client side to gain improved performance, as there is no need to perform complex operations at the client end. For instance, in some aspects, only the final vertex shading operation of extrapolation with the pre-processed warped vectors may be executed on the HMD or client side. This technique can significantly reduce the probability of artifacts post-warp, as well as enable a light and power-efficient client design.

Some aspects of the present disclosure can utilize a split architecture for ASW where the generation of motion vectors is instrumented at the server end. This can result in accurate and noise free implementation. In these instances, the client end can implement the extrapolation step and warp to latest display pose. In some aspects of this split architecture, motion vectors can be filtered at server prior to sending to the HMD or client by utilizing depth information. In some aspects, motion vectors can be filtered via a complex spatial and temporal adaptation of a filter kernel. Additionally, the methods herein can also use object segmentation data generated by a game engine to adapt the grid size for sampling vertices to reduce distortion.

Figure 6:
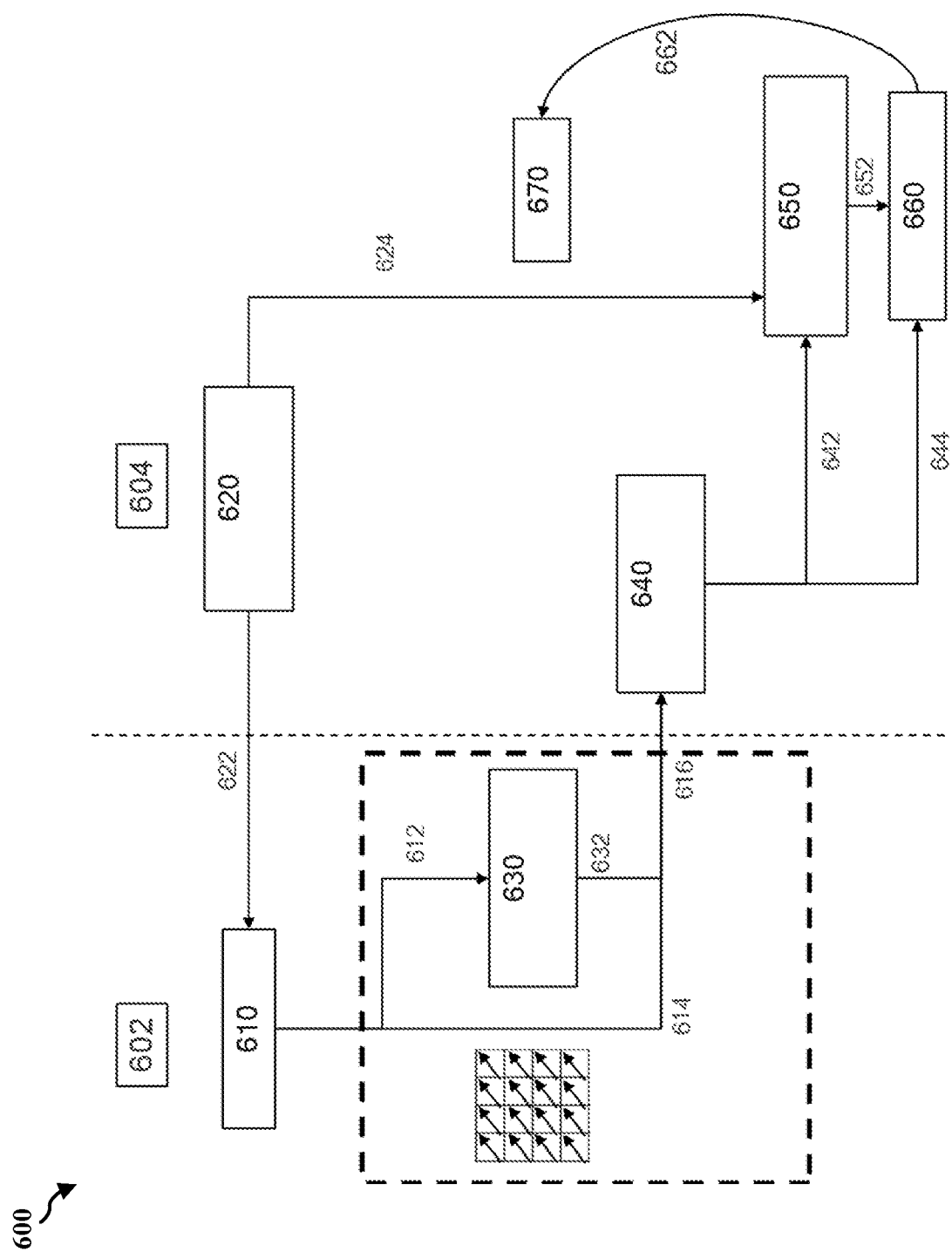
FIG. 6 illustrates another example of a content generation and coding system in accordance with the techniques of this disclosure.

FIG. 6 illustrates another example of a content generation and coding system 600 in accordance with the techniques of this disclosure. As shown in FIG. 6, system 600 includes server 602 and client 604. Server 602 includes renderer 610 and sample motion vectors 630. Client 604 includes head tracking system 620, decoder and motion vector parsing unit 640, motion vector filtering and extrapolation unit 650, warping unit 660, and display 670. System 600 also includes motion vectors 612, rendered frame 614, encoded motion vectors 616, pose 622, latest pose 624, sampled motion vectors 632, motion vectors 642, decoded frame 644, warped vectors 652, and warped frame 662.

As shown in FIG. 6, motion vectors can be generated and sampled at the server 602 and sent to the client 604. Thus, in some aspects, the entire motion vector production can be on the server 602. As explained supra, this is performed in this manner because the client 604 can use a large amount of power to run applications or games. Also, if the server 602 or game engine understands the location of the next motion, it can be more accurate to generate the motion vectors at the server 602. As shown in the example in FIG. 6, motion vectors can be sampled in a grid formation, and then sent to the client 604. After receiving the motion vectors, the client 604 can decode, extrapolate, and perform the warping.

In some aspects, per-pixel motion vectors generated by server or game engine can be noiseless and accurate as they can include the complete 3D geometry of a scene. Also, motion vectors from the server 602 or game engine can be generated without any additional overhead, which can result in no reduction in FPS. In other aspects, as shown in FIG. 6, the complexity of motion vector generation can be moved to server 602 which results in less computations on the client end and more power benefits. In these instances, the sophisticated filtering method can be avoided on the client end. In yet other instances, the present disclosure can include aspects to detect if other remote VR architecture is using game engine motion vectors for warping. For instance, the present disclosure can create a scene with a planar object with repetitive patterns. The motion vectors generated that utilize patch correlation or optical flow techniques can result in noisy motion vectors. This warping with such noisy motion vectors can result in artifacts. In some aspects, even if the artifacts are filtered, the filtering kernel can introduce smoothing and hence distortion. In other aspects, if the repetitive patterns are not distorted, it can be likely that they are using game engine motion vectors.

Figure 7:
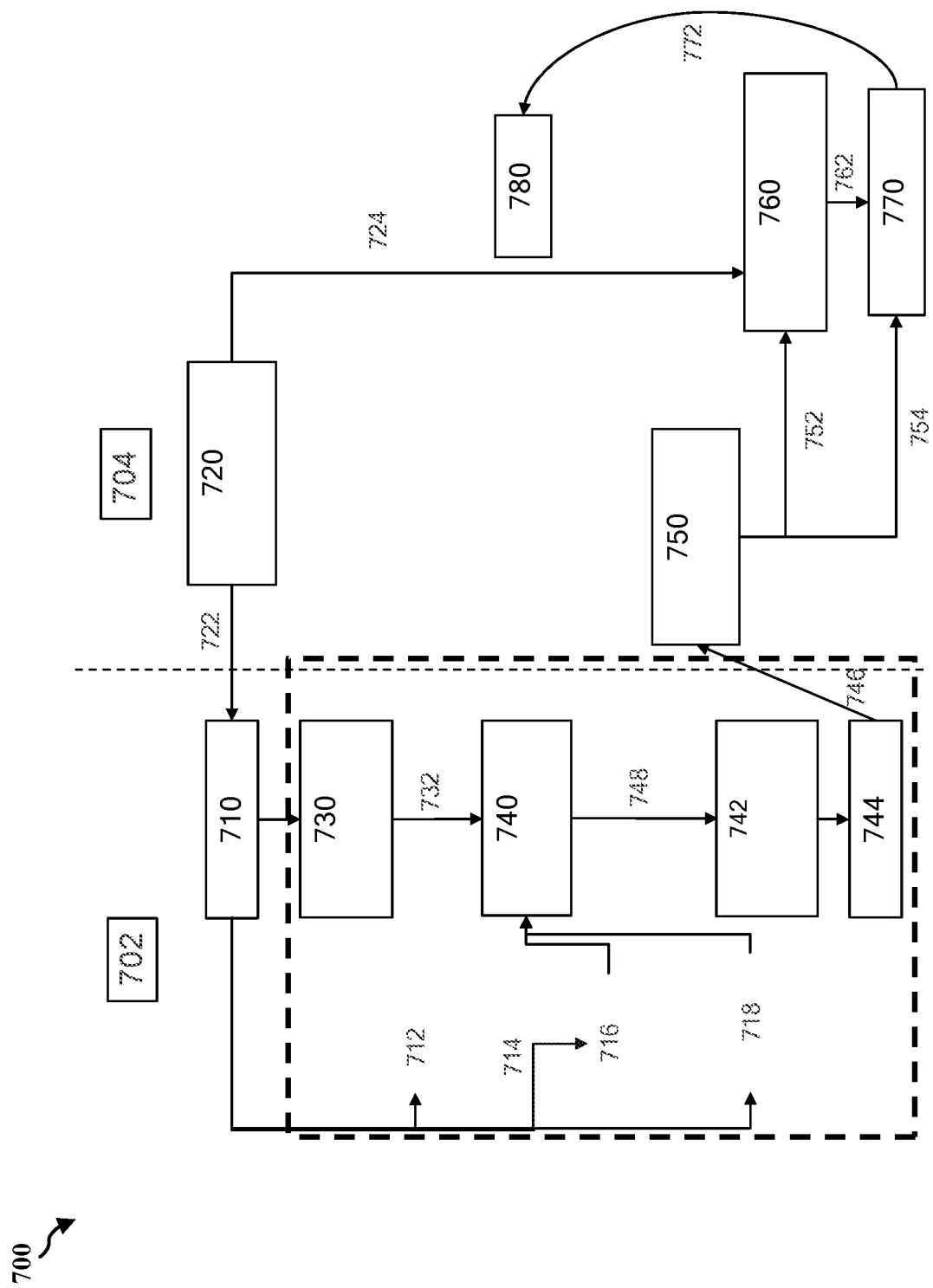
FIG. 7 illustrates another example of a content generation and coding system in accordance with the techniques of this disclosure.

FIG. 7 illustrates another example of a content generation and coding system 700 in accordance with the techniques of this disclosure. As shown in FIG. 7, system 700 includes server 702 and client 704. Server 702 includes renderer 710, pose predictor 730, depth based reprojection unit 740, modification unit 742, e.g., where occluded motion vectors are modified to avoid z-fighting, and filtered motion vectors 744. Client 704 includes head tracking system 720, decoder and motion vector parsing unit 750, motion vector filtering and extrapolation unit 760, warping unit 770, and display 780. System 700 also includes pose 722, rendered frame 712, motion vectors 714, sampled motion vectors 716, z-map 718, latest pose 724, predicted display pose 732, extrapolated motion vectors 748, encoded motion vectors 746, motion vectors 752, decoded frame 754, warped vectors 762, and warped frame 772.

In some aspects, the example shown in FIG. 7 can build on the example in FIG. 6, e.g., motion vector generation can be performed on the server 702. In some instances, even though the motion vectors can be noiseless, there may be an instance of one object going behind another object. This can affect the accuracy of depth in a scene. For example, despite receiving accurate and noiseless motion vectors, the filtering may still need to be performed to remove z-fighting artifacts and reduce distortion. Accordingly, in some aspects, the filtering step can be moved to the server 702 as well. In some aspects, the availability of a per-pixel depth map of scene at the server can be an advantage, as motion vectors can be handled properly to avoid z-fighting-like artifacts.

In other aspects, the present disclosure can predict a pose when the frame is likely to be displayed on the client or HMD. This can be based on network latency or other factors. Accordingly, the renderer 710 can predict what the pose 722 will be on the client 704. I.e., the renderer can predict when the frame will be displayed on the client end, which can be based on network latency or some prior history. The predicted pose, along with the z-map, can help filter motion vectors In some instances, there may be overlapping motion vectors if one object moves behind another. For example, triangles may overlap one another. In order to reduce this, the present disclosure can use the z-map to see which motion vectors, when extrapolated, may result in triangles going one behind the other. If these motion vectors are sent as is to the client 704, there may be z-fighting-like artifacts as the ASW on the client end may not utilize depth information. The server 702 may thus modify such motion vectors, i.e., filter them, before sending them to the client 704.

In some instances, since full 3D geometry is available, it can be fairly easy to re-project grid vertices to the predicted display pose. In these instances, overlapping grid points may occur. Additionally, motion vectors of grid points in occluded regions can be modified to avoid z-fighting-like artifacts. There may also be no notion of filtering with a kernel. Hence, there may be no need to rely on heuristics regarding kernel size selection. As explained above, because motion vector calculation can be done in this embodiment on the server side, where the depth map may be readily available as a by-product of rendering, the depth map can be used to modify the motion vectors to avoid z-fighting-like artifacts. When the motion vectors are modified to avoid these artifacts, the depth map can be used to weight the motion vectors to give precedence to the motion vector in the foreground. For instance, the triangles in the foreground may receive priority.

Figure 8:
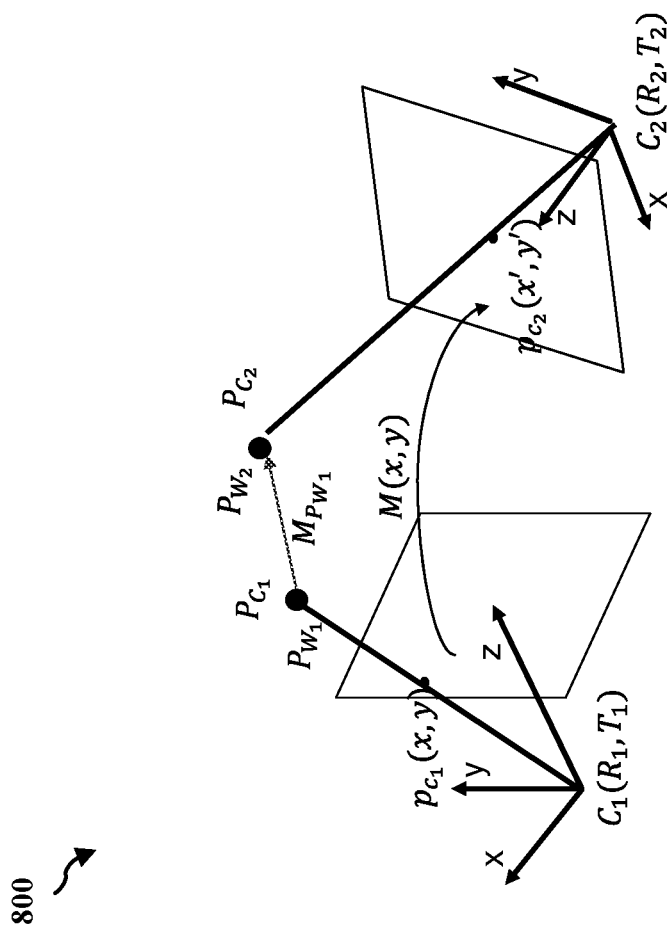
FIG. 8 illustrates an example of using motion vectors for warping techniques according to the present disclosure.
Figure 9:
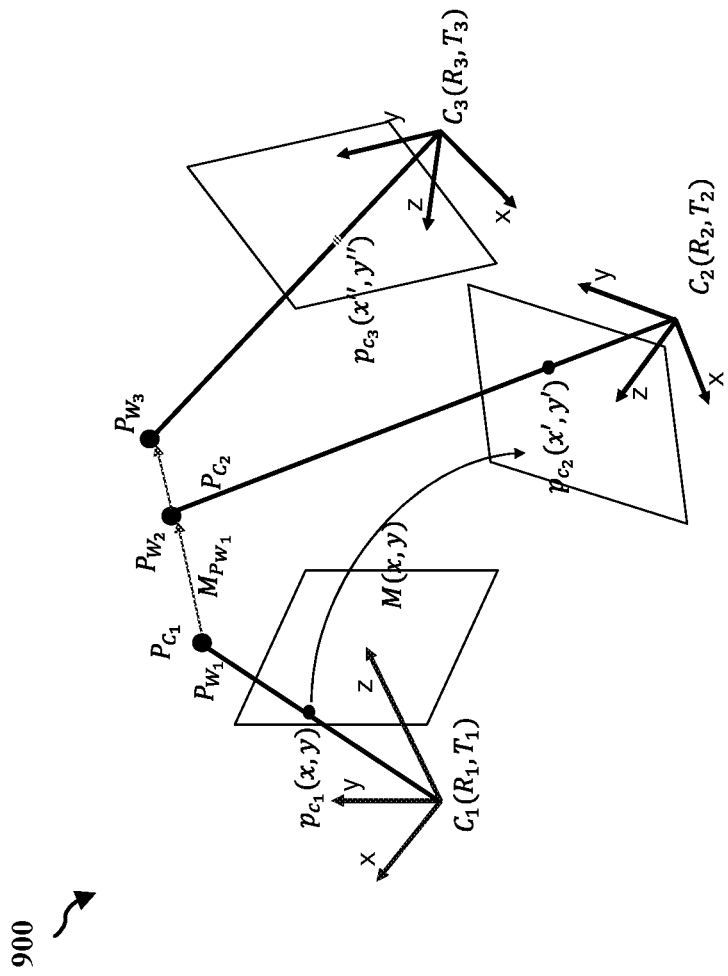
FIG. 9 illustrates an example of using motion vectors for warping techniques according to the present disclosure.

FIG. 8 illustrates an example of using motion vector 800 using warping techniques according to the present disclosure. As mentioned previously, the game engine or server can provide a pixel-level z-map and a motion vector map. As shown in FIG. 8, the present disclosure can consider two rendered frames at time (T−2) (camera $C_1$) and time T (camera $C_2$). As further displayed in FIG. 9, given a pixel $p_{c_1}$ (x, y) in $C_1$, $p_{c_2}$ (x', y') in $C_2$ can result from using pixel level motion map M at location $p_{c_1}$. Next, $p_{c_1}$ can be converted to 3D camera coordinate $P_{c_1}$, and $p_{c_2}$ can be converted to $P_{c_2}$.

In some aspects, a point, e.g., $P_C$ (X, Y, Z), in camera coordinates can be converted to world coordinates, e.g., $P_W$. For instance, a camera pose can be defined by rotation R and center C with respect to the world coordinate system. In order to represent a point in world coordinates compared to camera coordinates, the world coordinate system can be translated and rotated accordingly. A formula that can help with this translation is $P_W = R^{-1} P_C + C$. This corresponds to translating the coordinate by a factor of C and a rotation of R. At the server end, there can be a depth of Z (e.g., from the z-buffer) of every pixel (e.g., in x,y coordinates) in the rendered frame. Given f, the focal length of the camera, the corresponding 3D point obtained can be X=x(Z/f), Y=y(Z/f).

Also, an equation can be used to convert 3D points in the camera coordinate system to the world coordinate system. For instance, $P_{c_1}$ can be converted to $P_{W_1}$ and $P_{W_2}$ can be converted to $P_{W_2}$. It is noted that $P_{c_1}$ and $P_{W_1}$ are same points in different coordinate systems, as well as $P_{c_2}$ and $P_{W_2}$. Also, 3D motion of object point $P_{W_1}$ in the world coordinate system can be provided by $M_{P_{W_1}} = P_{W_2} - P_{W_1}$. Further, when transmitting the rendered frame at time T to the client, motion vectors or warped vectors can also be transmitted.

FIG. 9 illustrates an example of using motion vector 900 using warping techniques according to the present disclosure. As shown in FIG. 9, the present disclosure can consider three rendered frames at time camera $C_1$, camera $C_2$, and camera $C_3$. In the example shown in FIG. 9, 3D motion vectors can be extrapolated in world space to get 3D world point $P_{W_3}$ at distance D/2 from $P_{W_2}$, where D is the distance between $P_{W_1}$ and $P_{W_2}$. In some instances, the display pose for ASW is $C_3$, so the 3D world point can be re-projected to image point $p_{c_3}$ (x", y") using 3D-to-2D re-projection. At the server end, the pose $C_3$ may not be exactly know, so the server can attempt to predict it via pose-prediction. In other aspects, the extrapolated 2D motion vector at $p_{c_3}$ (x', y') can be based on the formula $M_{(x', y')}$=(x", y")−(x', y'). Also, the present disclosure can use the 2D motion vector to warp the grid triangles.

Figures 10A, 10B:
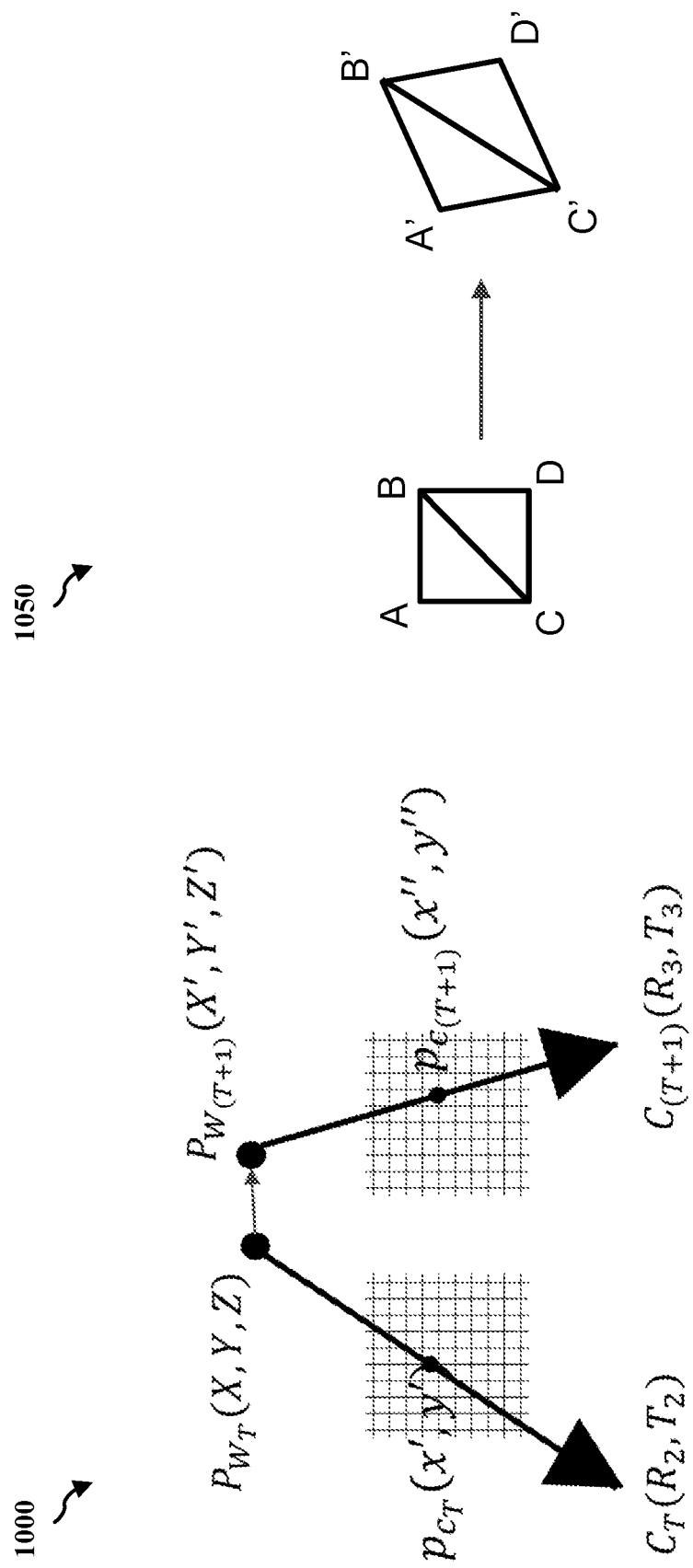
FIGS. 10A and 10B illustrate other examples of warping techniques according to the present disclosure.

FIGS. 10A and 10B illustrate the process of warping 1000 and 1050, respectively, with motion vectors at the client. In FIG. 10A, a grid of points has been overlaid on a first image rendered for camera pose $C_T$. This image can be warped to a second image appropriate for camera pose $C_{T+1}$ via ASW. A point (x', y') may be a grid point in the first image. A motion vector or warp vector $M_{(x', y')}$ may be determined for (x', y') based on the discussion above at the server and sent across to the client. The warp vector maps (x', y') in the first image to (x", y") in the second image. Warp vectors may be transmitted from the server to the client on a uniform grid of points.

In FIG. 10B, one square of such a grid overlaid on the first image has been illustrated. The square is formed of two the vertices (A, B, C, D) which in turn form the triangles ABC and BCD. Each of the vertices A, B, C, D are then mapped to locations A', B', C', D' in the second image based on the motion vectors transmitted for these grid points. Correspondingly, the triangles ABC and BCD may deform to triangles A'B'C' and B'C'D' as shown in 12B. In some cases of warp vectors the deformation may be such that A'B'C' and B'C'D' overlap on each other, i.e., the square ABCD may fold along the diagonal BC map, which results in z-fighting-like artifacts. This can happen for instance when objects have opposite motion, with the vertices A and D in the first image lying on different objects with opposing motion.

Objects with opposite motion may also cause z-fighting artifacts. In some aspects, the extrapolated motion vector or warp vector can be modified such that there are no overlapping triangles, and hence there may be no overlapping warp vectors. As discussed above, the modified motion vectors can then be sent to the client.

In yet other aspects, motion vectors or warp vectors sent to client can be directly used for ASW or warping the triangles. For instance, if the warp vectors are sent as is to the client, they can cause z-fighting artifacts. Accordingly, the warp vectors may need to be modified. In the previous examples, the re-projection to pose C3 can provide the depth of each grid point in the rendered image at time T relative to the camera origin at C3. The present disclosure can use these z-values or object distance to the camera to prioritize modifying warp vectors accordingly. In these instances, the foreground object can have minimal modifications whereas the background objects can have greater modifications. For example, in a scene with foreground object moving towards the right and a background object moving towards the left, the extrapolated motion vectors or warp vectors can be indicated. In other aspects, a heuristic based method can be used to modify the warp vectors such that there may be no overlapping or conflicting motion vectors.

In further aspects, an algorithm can be used to modify motion vectors. For example, at step 1, extrapolated 3D motion vectors can be extrapolated to pose at (T+1) for each grid point in a rendered image generated at time T. At step 2, the present disclosure can extrapolate the grid points using these motion vectors and determine their pixel locations and z-values relative to C3, wherein the z-values can be obtained from the extrapolated 3D point relative to C3. For example, one grid point (x, y) in an image at time T maps to the 3D point (x1, y1, Z1) in (T+1). At step 3, if the frame is fragment shaded at a predicted pose for (T+1), the Z-buffer, Z(x, y), can be obtained for all (x, y) coordinates in the image for (T+1). At step 4, all the grid points (x,y) can be cycled through in an image at time T and compare Z(x1, y1) against Z1. If Z(x1, y1) is the same as Z1 for a grid point, then the grid point is visible from C3. If not, then the grid point is occluded, so all the grid points in image at time T are either in set SV (e.g., visible) or set SO (e.g., occluded). At step 5, the present disclosure can loop over all triangles on the grid in T, wherein a triangle is from one of these sets S1, S2, or S3. In S1, all three vertices can be from SV. In S2, two vertices can be from SV and one vertex from SO. In S3, two vertices can be from SO and one vertex can be from SV. In S4, all vertices can be from SO. At step 6, the present disclosure may not modify motion vectors of triangles of set S1 because all vertices are visible. At step 7, the present disclosure can cycle through a list of triangles in S2 and select a triangle and look at the vertex from SO. The present disclosure can then assign it a motion vector such that the area of triangle becomes zero. For example, a motion vector of a occluded vertex can be such that it coincides with either of the other two vertices post-warping to C3. In some aspects, this previously occluded vertex is upgraded to list SV and S1 through S4 are updated. This can be continued until all triangles in S2 are exhausted. At step 8, the present disclosure can cycle through S3, wherein for each triangle in S3 its vertices in SO are observed and a motion vector is assigned such that area of triangle can be zero. For example, the motion vectors for the occluded vertices can be computed so that they coincide with the visible vertex post-warping to C3. Both these vertices can be promoted to SV and S1 through S4 can be updated. If S2 is updated, the algorithm can go back to step 7. At step 9, the present disclosure can cycle through S4, wherein for each triangle in S4 all its vertices can be observed, and motion vectors can be assigned such that area of triangle can be zero. For example, motion vectors for all three vertices can be such that they coincide to same point post-warp in C3. The present disclosure can promote them to SV and S1 through S4 can be updated. If S2 is updated, the algorithm can go back to step 7. If S3 is updated, the algorithm can go back to step 8. Otherwise, the algorithm can cycle through the next triangle in step 9.

Figure 11:
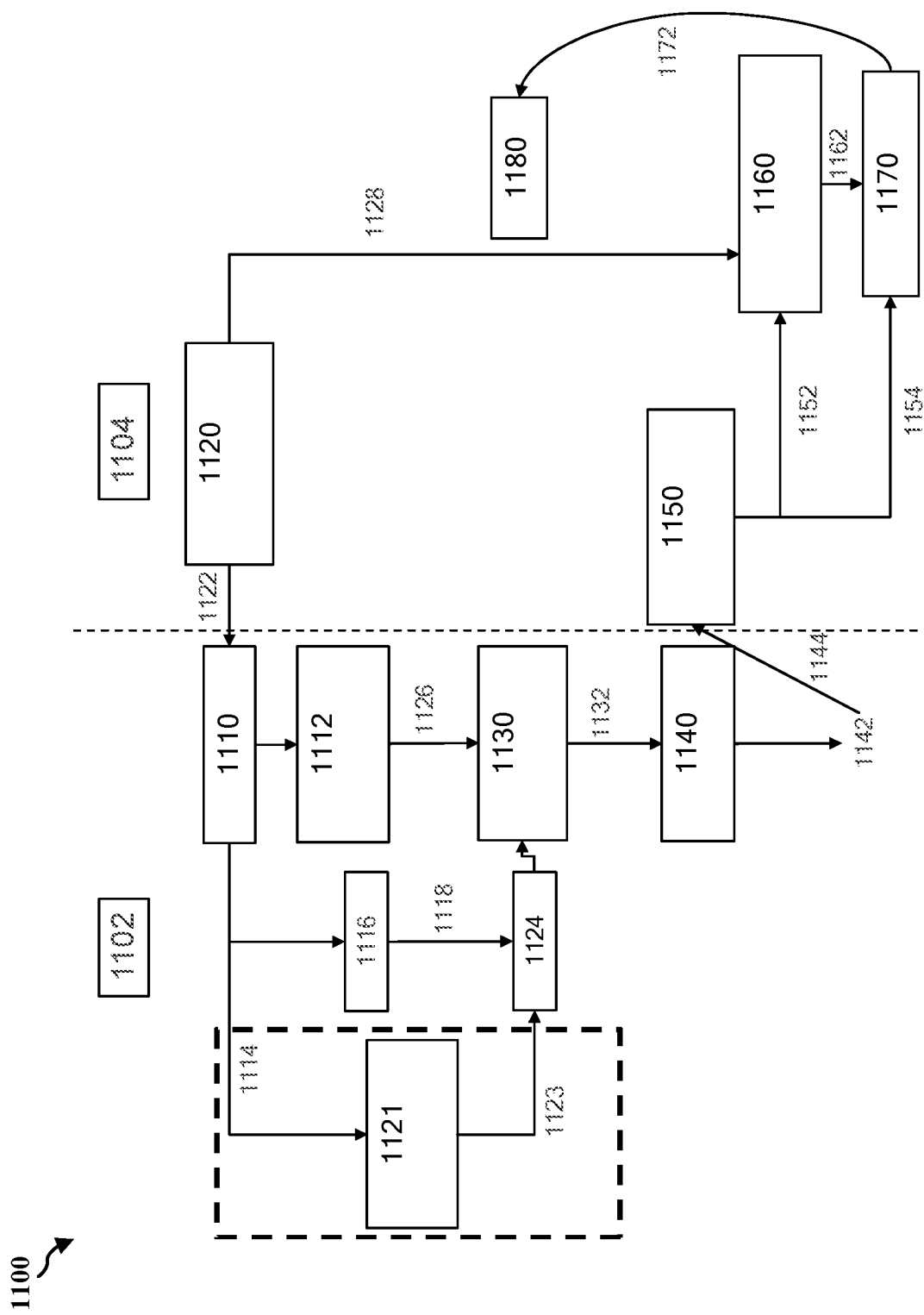
FIG. 11 illustrates another example of a content generation and coding system in accordance with the techniques of this disclosure.

FIG. 11 illustrates another example of a content generation and coding system 1100 in accordance with the techniques of this disclosure. As shown in FIG. 11, system 1100 includes server 1102 and client 1104. Server 1102 includes renderer 1110, pose predictor 1112, vertex generation unit 1121, depth based reprojection unit 1130, modification unit 1140, e.g., where occluded motion vectors are modified to avoid z-fighting, and modified motion vectors 1142. Client 1104 includes head tracking system 1120, decoder and motion vector parsing unit 1150, motion vector filtering and extrapolation unit 1160, warping unit 1170, and display 1180. System 1100 also includes pose 1122, segmentation map 1114, rendered information 1116, motion vectors 1118, sampled vertices 1123, sampled motion vectors 1124, predicted display pose 1126, latest pose 1128, extrapolated motion vectors 1132, encoded motion vectors 1144, motion vectors 1152, decoded frame 1154, warped vectors 1162, and warped frame 1172.

As explained supra, previous embodiments can move most of the complexity of ASW onto the server 1102. The grid size can affect distortion on objects in a scene, such that a single grid size across a scene may cause distortions near object boundaries. In some aspects, if a grid is warped, the objects may move together. For example, if the grid can encompass both foreground and background objects, then there may be stretching in one of the objects. As pixels belonging to same object move similarly, a large grid size may be large enough so the pixels can move uniformly. In other aspects, having a grid enclosing multiple object regions may cause distortions if the same motion vectors are applied to those regions. Accordingly, there may be a need for a finer grid near object boundaries.

In some aspects, the present disclosure can decide the grid granularity based on segmentation data which is available readily from the game engine or server. For each pixel location, the game engine or server can output an object identification (ID). As shown in FIG. 11, this can be accomplished with a segmentation map 1114. In some aspects, the present disclosure can have a large grid encompassing an entire object. In other aspects, the present disclosure can have smaller grids near the boundaries of objects. As indicated in FIG. 11, the grid vertices can be obtained using the segmentation map 1114, wherein motion vectors can be sampled using these vertex locations.

In some aspects, the game engine or server 1102 can generate rendered frames, motion vectors, a z-map, and a segmentation map. As explained above, the segmentation map can produce an ID with each pixel. Object IDs in the segmentation map can be analyzed to figure out the object boundaries. The present disclosure can use the segmentation map which can be available from the game engine or server, in order to decide what the grid size should be near the object boundaries. Once again, the vertex or vertices sampling can be based on the object boundaries. For instance, a higher number of points can be sampled when using a finer grid near object boundaries. By using a smaller grid, a better image can be obtained from the sampled points. The present disclosure can use smaller grids near object boundaries, because this region is more susceptible to stretching. Also, there can be fewer sampled points for courser grids in regions inside same object. The present disclosure can utilize a larger grid for objects entirely in the grid because objects in a grid can all move at the same speed. Additionally, a constant grid can subsample grid points at the same locations, which can give rise to stretching because of objects in the grid. The aforementioned subsampling can use grid sizes to predict motion vectors and send them to the client.

As mentioned herein, in some aspects, the segmentation map can provide the game engine with an ID for a particular pixel location. As such, any pixel on an object can return the object ID of an image. Accordingly, the game engine can have an idea of the geometry of the entire scene. The present disclosure can use the segmentation map to get the boundaries of each object and, as mentioned above, use a finer grid around the object boundaries. Therefore, the present disclosure may not use constant grid sizes. Additionally, motion vector vertices can be placed on the map to get a better idea of the objects. In other aspects, motion vectors can be sampled based on these potentially non-uniform sampled vertices. In some instances, performing accurate segmentation on client end can be expensive and/or impractical. Thus, it can be easier for the game engine or server to find the segmentation map because it has all the information to know which pixel belongs to which object.

In further aspects, the present disclosure can analyze motion vectors to verify whether an object is stationary or moving. Warped vectors can then be computed using ATW with depth or ASW, as mentioned previously. Applying ASW on stationary objects may cause unnecessary distortions. In some instances, methods of warp vector generation can be spatially switched between these two methods. In the present disclosure, motion vectors can be modified such that there may be no z-fighting (e.g., based on depth). However, this may not remedy the stretching of objects. In order to minimize stretching of objects, motion vectors can be filtered spatially and temporally using sophisticated methods on the server end. As noted above, the high horsepower server can more easily afford the high computations. Also, filtering can be based on motion vector differences between adjacent grid points. Motion vectors can be modified to avoid a large difference between neighboring grid points which can cause stretching. Once again, the depth map can be used to prioritize foreground objects. Accordingly, stretching can be minimized on foreground objects even at the expense of higher stretching on background objects. In some aspects, stretching on foreground objects can be highly disturbing. In other aspects, filtering can be performed on the foveal or central region of a scene, e.g., where user may be most likely focus.

Figure 12:
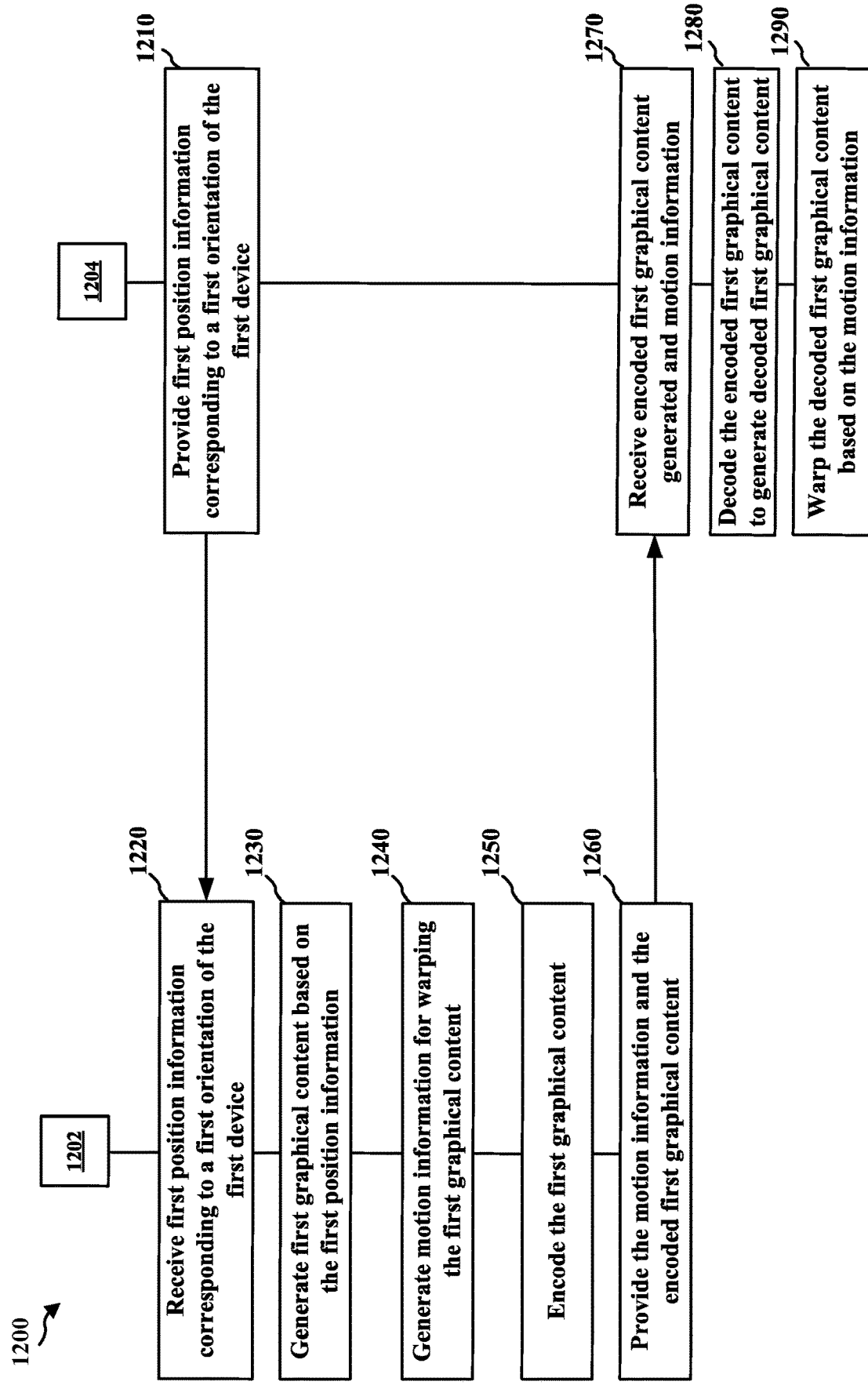
FIG. 12 is a diagram illustrating transmissions in accordance with the techniques of this disclosure.

FIG. 12 is a diagram 1200 illustrating transmissions between a device (e.g., first device 1202) and another device (e.g., second device 1204). For instance, at 1210, second device 1204 can provide first position information corresponding to a first orientation of the second device, as described in connection with the examples in FIGS. 5-11. Likewise, at 1220, the first device 1202 can receive first position information corresponding to a first orientation of the second device, as described in connection with the examples in FIGS. 5-11. At 1230, the first device 1202 can generate first graphical content based on the first position information, as described in connection with the examples in FIGS. 5-11. Additionally, at 1240, the first device 1202 can generate motion information for warping the first graphical content, as described in connection with the examples in FIGS. 5-11. At 1250, the first device 1202 can encode the first graphical content, as described in connection with the examples in FIGS. 5-11.

The first device 1202 can also subsample the motion information to generate subsampled motion information, as described in connection with the examples in FIGS. 5-11. The first graphical content can include a plurality of pixels and the motion information can include a first number of motion vectors. Also, the first number of motion vectors can include a respective motion vector for each respective pixel of the plurality of pixels. The subsampled motion information can include a second number of motion vectors. In some instances, the second number of motion vectors can be less than the first number of motion vectors. In further aspects, the motion information provided to the second device 1204 can be the subsampled motion information, as described in connection with the examples in FIGS. 5-11. In some aspects, subsampling the motion information to generate the subsampled motion information can comprise subsampling the motion information to generate the subsampled motion information based on a grid having a number of grid points, as described in connection with the examples in FIGS. 5-11. Also, each grid point of the number of grid points can be a subsampling location. The second number of motion vectors can also equal the number of grid points of the grid. In some aspects, the first graphical content can include an object with a boundary. The number of grid points may include fine grid points and course grid points, such that the fine grid points can be closer to the boundary of the object than the course grid points. In other aspects, the first distance between a first grid point of the fine grid points and a second grid point of the fine grid points can be smaller than a second distance between a first grid point of the course grid points and a second grid point of the course grid points.

In some aspects, the aforementioned first graphical content can be a frame of graphical content. Also, generating the motion information can comprise generating the motion information based on three dimensional vertex information from which the first graphical content can be generated, as described in connection with the examples in FIGS. 5-11. In other aspects, generating the motion information can comprise generating the motion information based on a comparison of the first graphical content to second graphical content. In some instances, the first graphical content can be a current frame and the second graphical content can be a previous frame. Additionally, the frames can be assigned a frame number N, e.g., the current frame can be frame N and the previous frame can be N−1.

In some aspects, the first device 1202 can also determine second position information corresponding to a predicted orientation of the second device 1204, as described in connection with the examples in FIGS. 5-11. The first device 1202 can also generate second graphical content based on the second position information, as described in connection with the examples in FIGS. 5-11. Further, the first device 1202 can compare the first graphical content to the second graphical content, as described in connection with the examples in FIGS. 5-11. In some aspects, comparing the first graphical content to the second graphical content can further comprise generating depth information including a plurality of pixels associated with the first graphical content and the second graphical content, such that the depth information includes a depth value for each pixel of the plurality of pixels. Comparing the first graphical content to the second graphical content can also comprise determining, based on the depth information, which pixels of the plurality of pixels correspond to a first depth value and which pixels of the plurality of pixels correspond to a second depth value. In some aspects, the first depth value can correspond to a foreground value and the second depth value can correspond to a background value. In other aspects, the first device 1202 can modify the motion information based on the determination of which pixels correspond to the first depth value and which pixels correspond to the second depth value. The modified motion information can also include a first number of motion vectors including a motion vector for each pixel of the plurality of pixels. Modifying the motion information can comprise extrapolating the first number of motion vectors to generate a second number of extrapolated motion vectors, as described in connection with the examples in FIGS. 5-11. Furthermore, modifying the motion information can comprise transmitting the second number of extrapolated motion vectors.

In some aspects, the first graphical content can include a plurality of pixels and the first device 1202 can generate a segmentation map that maps each respective pixel of the plurality of pixels to a respective object identifier of a plurality of object identifiers, as described in connection with the examples in FIGS. 5-11. The first device 1202 can also determine, based on the segmentation map, where one or more object boundaries exist in the first graphical content, as described in connection with the examples in FIGS. 5-11. In addition, the first device 1202 can apply a grid having a number of grid points to the motion information based on the determination of where one or more object boundaries exist in the first graphical content, as described in connection with the examples in FIGS. 5-11. The first device 1202 can also subsample the motion information to generate the subsampled motion information based on the grid, such that each grid point of the number of grid points can be a subsampling location, as described in connection with the examples in FIGS. 5-11. As mentioned above, the number of grid points can include fine grid points and course grid points. The fine grid points can be closer to the one or more object boundaries than the course grid points. Also, in some instances, a first distance between a first grid point of the fine grid points and a second grid point of the fine grid points can be smaller than a second distance between a first grid point of the course grid points and a second grid point of the course grid points.

Additionally, the first device 1202 can filter the motion information based on the comparison of the first graphical content to the second graphical content, as described in connection with the examples in FIGS. 5-11. At 1260, the first device 1202 can provide the motion information and the encoded first graphical content to the second device 1204, as described in connection with the examples in FIGS. 5-11.

At 1270, the second device 1204 can receive encoded first graphical content generated based on the first position information, as described in connection with the examples in FIGS. 5-11. At 1270, the second device 1204 can also receive motion information, as described in connection with the examples in FIGS. 5-11. At 1280, the second device 1204 can decode the encoded first graphical content to generate decoded first graphical content, as described in connection with the examples in FIGS. 5-11. Also, at 1290, the second device 1204 can warp the decoded first graphical content based on the motion information, as described in connection with the examples in FIGS. 5-11.

In some aspects, the decoded first graphical content can include a plurality of pixels, such that the motion information can include a number of motion vectors, as described in connection with the examples in FIGS. 5-11. The number of motion vectors can include a respective motion vector for each respective pixel of the plurality of pixels. Moreover, the decoded first graphical content can include a number of pixels and the motion information can include a number of motion vectors. In some instances, the number of motion vectors can be less than the number of pixels. The second device 1204 can also upsample the motion information, such that warping the decoded first graphical content based on the motion information can comprise warping the decoded first graphical content based on the upsampled motion information, as described in connection with the examples in FIGS. 5-11. The decoded first graphical content can include a plurality of pixels, such that the upsampled motion information can include a number of motion vectors, wherein the number of motion vectors can include a respective motion vector for each respective pixel of the plurality of pixels.

In other aspects, the motion information can be filtered based on the first graphical content and second graphical content, as described in connection with the examples in FIGS. 5-11. The motion information can also be modified based on depth information including a plurality of pixels associated with the first graphical content and the second graphical content. Also, receiving the motion information can further comprise receiving modified motion information including a first number of motion vectors including a motion vector for each pixel of the plurality of pixels, as described in connection with the examples in FIGS. 5-11. The modified motion information can also include a second number of extrapolated motion vectors. The encoded first graphical content can include a plurality of pixels, such that each pixel of the plurality of pixels can be mapped to an object identifier of a plurality of object identifiers by a segmentation map. Also, one or more object boundaries in the first graphical content can be determined by the segmentation map, as described in connection with the examples in FIGS. 5-11. The one or more object boundaries can be determined based on a grid including a number of grid points to the motion information, such that each grid point of the number of grid points can be a subsampling location. In addition, the number of grid points can include fine grid points and course grid points, wherein the fine grid points can be closer to the one or more object boundaries than the course grid points. Further, a first distance between a first grid point of the fine grid points and a second grid point of the fine grid points can be smaller than a second distance between a first grid point of the course grid points and a second grid point of the course grid points.

Figure 13:
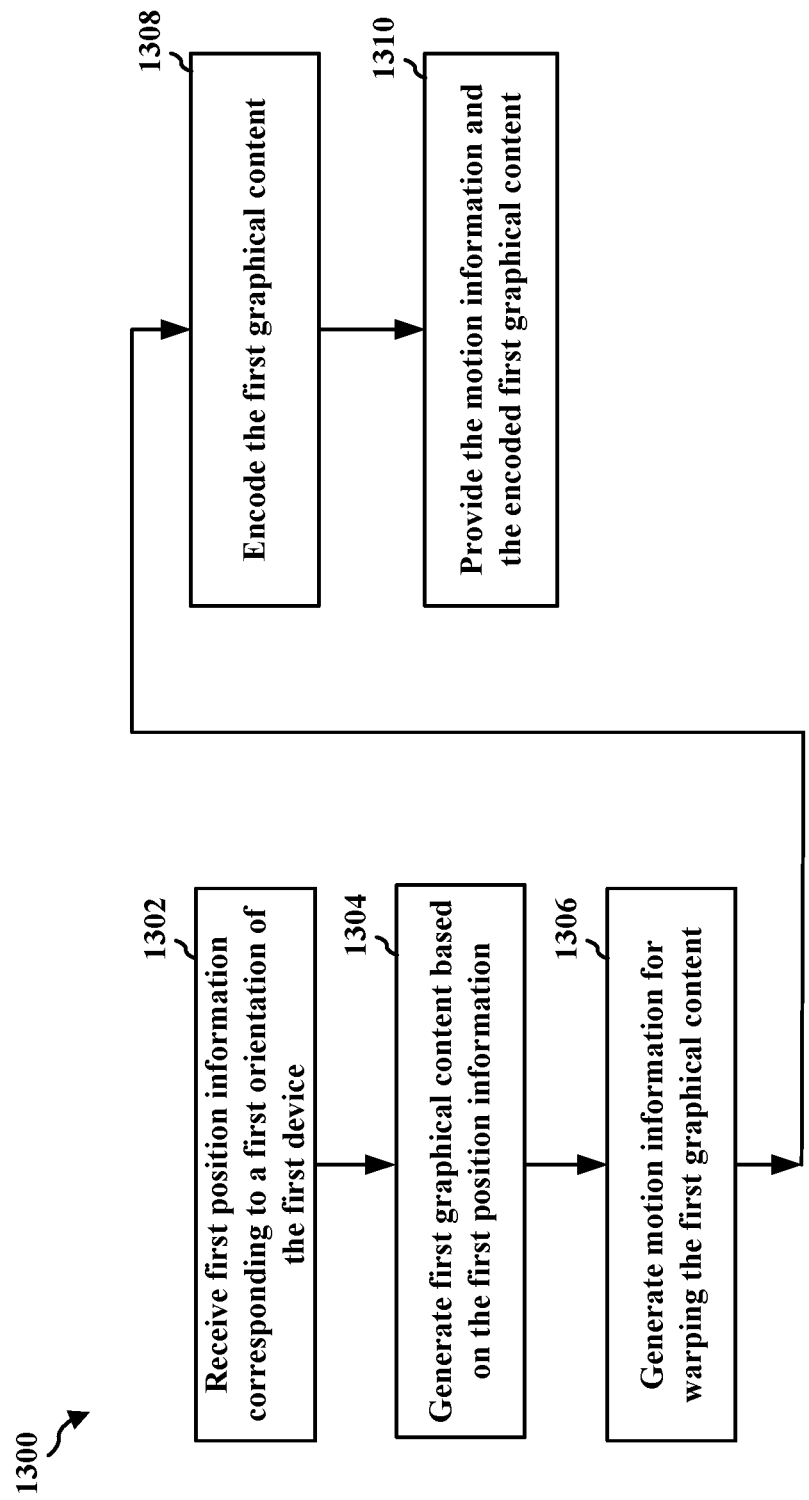
FIG. 13 illustrates an example flowchart of an example method in accordance with one or more techniques of this disclosure.

FIG. 13 illustrates an example flowchart 1300 of an example method in accordance with one or more techniques of this disclosure. For instance, at 1302, a device can receive first position information corresponding to a first orientation of another device, as described in connection with the examples in FIGS. 5-12. For example, in FIG. 12, at 1220, the first device can receive first position information corresponding to a first orientation of another device. At 1304, the device can generate first graphical content based on the first position information, as described in connection with the examples in FIGS. 5-12. For example, in FIG. 12, at 1230, the first device can generate first graphical content based on the first position information. Additionally, at 1306, the device can generate motion information for warping the first graphical content, as described in connection with the examples in FIGS. 5-12. For example, in FIG. 12, at 1240, the first device can generate motion information for warping the first graphical content. At 1308, the device can encode the first graphical content, as described in connection with the examples in FIGS. 5-12.

The device can also subsample the motion information to generate subsampled motion information, as described in connection with the examples in FIGS. 5-12. The first graphical content can include a plurality of pixels and the motion information can include a first number of motion vectors. Further, the first number of motion vectors can include a respective motion vector for each respective pixel of the plurality of pixels. The subsampled motion information can include a second number of motion vectors. In some instances, the second number of motion vectors can be less than the first number of motion vectors. In further aspects, the motion information provided to another device can be the subsampled motion information, as described in connection with the examples in FIGS. 5-12. Subsampling the motion information to generate the subsampled motion information can comprise subsampling the motion information to generate the subsampled motion information based on a grid having a number of grid points, as described in connection with the examples in FIGS. 5-12. Each grid point of the number of grid points can be a subsampling location. The second number of motion vectors can also equal the number of grid points of the grid. The first graphical content can include an object with a boundary. The number of grid points may include fine grid points and course grid points, such that the fine grid points can be closer to the boundary of the object than the course grid points. In other aspects, the first distance between a first grid point of the fine grid points and a second grid point of the fine grid points can be smaller than a second distance between a first grid point of the course grid points and a second grid point of the course grid points.

In some aspects, the aforementioned first graphical content can be a frame of graphical content. Additionally, generating the motion information can comprise generating the motion information based on three dimensional vertex information from which the first graphical content can be generated, as described in connection with the examples in FIGS. 5-12. In other aspects, generating the motion information can comprise generating the motion information based on a comparison of the first graphical content to second graphical content. In some instances, the first graphical content can be a current frame and the second graphical content can be a previous frame. Additionally, the frames can be assigned a frame number N, e.g., the current frame can be frame N and the previous frame can be N−1.

In some aspects, the device can also determine second position information corresponding to a predicted orientation of another device, as described in connection with the examples in FIGS. 5-12. The device can also generate second graphical content based on the second position information, as described in connection with the examples in FIGS. 5-12. Further, the device can compare the first graphical content to the second graphical content, as described in connection with the examples in FIGS. 5-12. In some aspects, comparing the first graphical content to the second graphical content can further comprise generating depth information including a plurality of pixels associated with the first graphical content and the second graphical content, such that the depth information includes a depth value for each pixel of the plurality of pixels. Comparing the first graphical content to the second graphical content can also comprise determining, based on the depth information, which pixels of the plurality of pixels correspond to a first depth value and which pixels of the plurality of pixels correspond to a second depth value. In some aspects, the first depth value can correspond to a foreground value and the second depth value can correspond to a background value. In other aspects, the device can modify the motion information based on the determination of which pixels correspond to the first depth value and which pixels correspond to the second depth value. The modified motion information can also include a first number of motion vectors including a motion vector for each pixel of the plurality of pixels. Modifying the motion information can comprise extrapolating the first number of motion vectors to generate a second number of extrapolated motion vectors, as described in connection with the example in FIG. 8. Moreover, modifying the motion information can comprise transmitting the second number of extrapolated motion vectors.

In some aspects, the first graphical content can include a plurality of pixels and the device can generate a segmentation map that maps each respective pixel of the plurality of pixels to a respective object identifier of a plurality of object identifiers. The device can also determine, based on the segmentation map, where one or more object boundaries exist in the first graphical content. In addition, the device can apply a grid having a number of grid points to the motion information based on the determination of where one or more object boundaries exist in the first graphical content. The device can also subsample the motion information to generate the subsampled motion information based on the grid, such that each grid point of the number of grid points can be a subsampling location, as described in connection with the examples in FIGS. 5-12. As mentioned above, the number of grid points can include fine grid points and course grid points. The fine grid points can be closer to the one or more object boundaries than the course grid points. Also, a first distance between a first grid point of the fine grid points and a second grid point of the fine grid points can be smaller than a second distance between a first grid point of the course grid points and a second grid point of the course grid points.

The device can also filter the motion information based on the comparison of the first graphical content to the second graphical content, as described in connection with the examples in FIGS. 5-12. At 1310, the device can provide the motion information and the encoded first graphical content to the other device, as described in connection with the examples in FIGS. 5-12.

Figure 14:
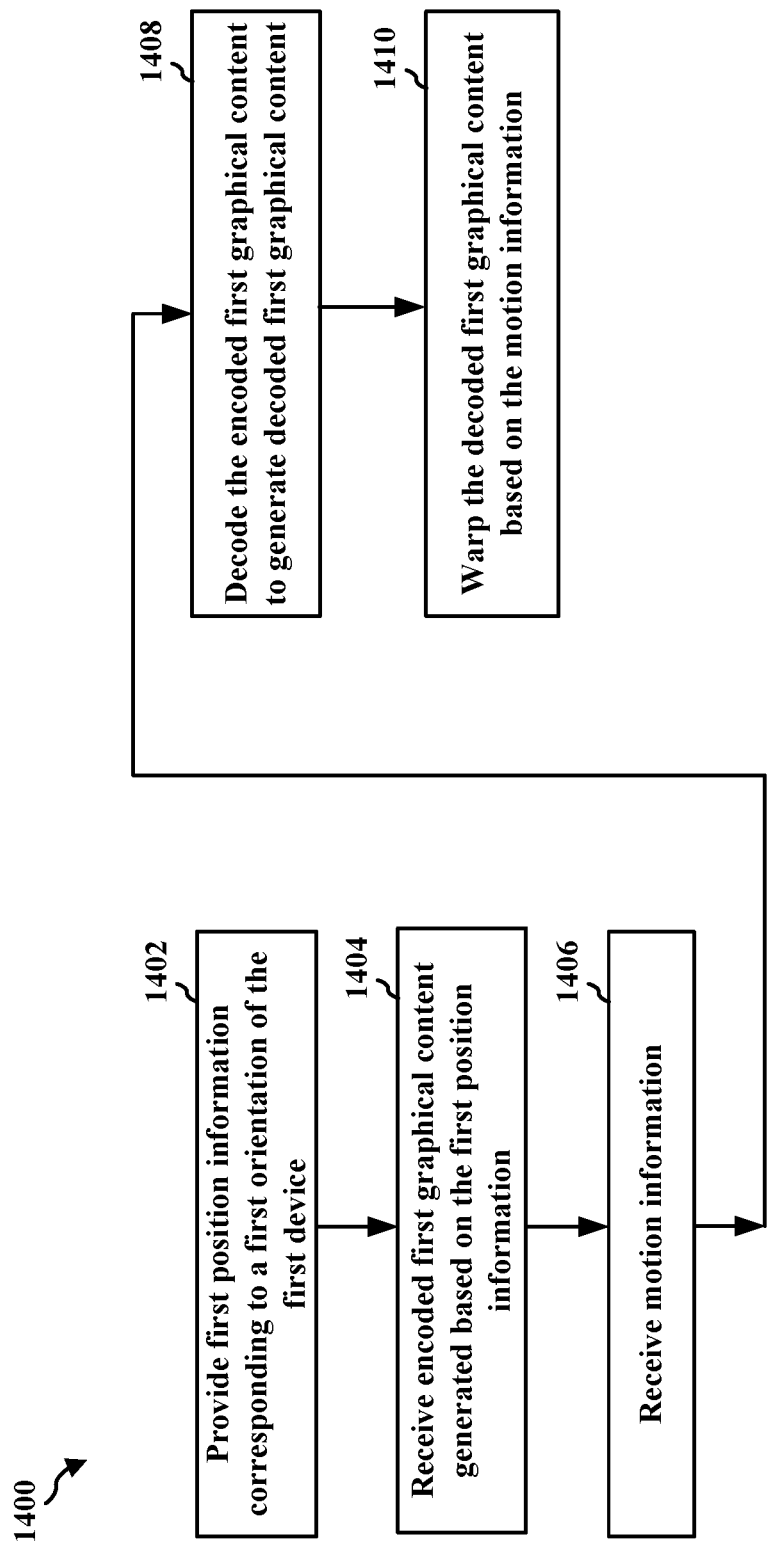
FIG. 14 illustrates an example flowchart of an example method in accordance with one or more techniques of this disclosure.

FIG. 14 illustrates an example flowchart 1400 of an example method in accordance with one or more techniques of this disclosure. For instance, at 1402, a device can provide first position information corresponding to a first orientation of the second device, as described in connection with the examples in FIGS. 5-12. At 1404, the device can receive encoded first graphical content generated based on the first position information, as described in connection with the examples in FIGS. 5-12. For example, in FIG. 12, at 1270, the second device 1204 can receive encoded first graphical content generated based on the first position information. At 1406, the device can also receive motion information, as described in connection with the examples in FIGS. 5-12. For example, in FIG. 12, at 1270, the second device 1204 can also receive motion information. At 1408, the device can decode the encoded first graphical content to generate decoded first graphical content, as described in connection with the examples in FIGS. 5-12. For example, in FIG. 12, at 1280, the second device 1204 can decode the encoded first graphical content to generate decoded first graphical content. Also, at 1410, the device can warp the decoded first graphical content based on the motion information, as described in connection with the examples in FIGS. 5-12. For example, in FIG. 12, at 1290, the second device 1204 can warp the decoded first graphical content based on the motion information.

In some aspects, the decoded first graphical content can include a plurality of pixels, such that the motion information can include a number of motion vectors, as described in connection with the examples in FIGS. 5-12. The number of motion vectors can include a respective motion vector for each respective pixel of the plurality of pixels. Additionally, the decoded first graphical content can include a number of pixels and the motion information can include a number of motion vectors. In some instances, the number of motion vectors can be less than the number of pixels. The device can also upsample the motion information, such that warping the decoded first graphical content based on the motion information can comprise warping the decoded first graphical content based on the upsampled motion information, as described in connection with the examples in FIGS. 5-12. The decoded first graphical content can include a plurality of pixels, such that the upsampled motion information can include a number of motion vectors, wherein the number of motion vectors can include a respective motion vector for each respective pixel of the plurality of pixels.

In other aspects, the motion information can be filtered based on the first graphical content and second graphical content, as described in connection with the examples in FIGS. 5-12. The motion information can also be modified based on depth information including a plurality of pixels associated with the first graphical content and the second graphical content. Further, receiving the motion information can further comprise receiving modified motion information including a first number of motion vectors including a motion vector for each pixel of the plurality of pixels, as described in connection with the examples in FIGS. 5-12. The modified motion information can also include a second number of extrapolated motion vectors. The encoded first graphical content can include a plurality of pixels, such that each pixel of the plurality of pixels can be mapped to an object identifier of a plurality of object identifiers by a segmentation map. Also, one or more object boundaries in the first graphical content can be determined by the segmentation map, as described in connection with the examples in FIGS. 5-12. The one or more object boundaries can be determined based on a grid including a number of grid points to the motion information, such that each grid point of the number of grid points can be a subsampling location. Additionally, the number of grid points can include fine grid points and course grid points, wherein the fine grid points are closer to the one or more object boundaries than the course grid points. Further, a first distance between a first grid point of the fine grid points and a second grid point of the fine grid points can be smaller than a second distance between a first grid point of the course grid points and a second grid point of the course grid points.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules or units are described in this disclosure to emphasize functional aspects of devices configured to perform the disclosed techniques, but do not necessarily require realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of graphics processing at a first device, comprising:
receiving, from a second device, first position information corresponding to a first orientation of the second device;
determining second position information corresponding to a predicted orientation of the second device;
generating first graphical content based on the first position information and second graphical content based on the second position information;
comparing the first graphical content to the second graphical content, wherein comparing the first graphical content to the second graphical content further comprises:
generating depth information including a plurality of pixels associated with the first graphical content and the second graphical content, wherein the depth information includes a depth value for each pixel of the plurality of pixels; and
determining, based on the depth information, which pixels of the plurality of pixels correspond to a first depth value and which pixels of the plurality of pixels correspond to a second depth value;
generating motion information for warping the first graphical content;
modifying the motion information based on the determination of which pixels correspond to the first depth value and which pixels correspond to the second depth value, wherein the modified motion information includes a first number of motion vectors including a motion vector for each pixel of the plurality of pixels, wherein modifying the motion information further comprises:
extrapolating the first number of motion vectors to generate a second number of extrapolated motion vectors; and
transmitting, to the second device, the second number of extrapolated motion vectors;
filtering the motion information based on the comparison of the first graphical content to the second graphical content;
encoding the first graphical content; and
providing, to the second device, the motion information and the encoded first graphical content.

2. The method of claim 1, further comprising:
subsampling the motion information to generate subsampled motion information.

3. The method of claim 2, wherein the first graphical content includes the plurality of pixels, wherein the motion information includes the first number of motion vectors, and wherein the first number of motion vectors includes a respective motion vector for each respective pixel of the plurality of pixels.

4. The method of claim 3, wherein the subsampled motion information includes a second number of motion vectors, wherein the second number of motion vectors is less than the first number of motion vectors, and wherein the motion information provided to the second device is the subsampled motion information.

5. The method of claim 4, wherein subsampling the motion information to generate the subsampled motion information comprises subsampling the motion information to generate the subsampled motion information based on a grid having a number of grid points, and wherein each grid point of the number of grid points is a subsampling location.

6. The method of claim 5, wherein the second number of motion vectors equals the number of grid points of the grid.

7. The method of claim 6, wherein the first graphical content includes an object with a boundary, wherein the number of grid points includes fine grid points and course grid points, wherein the fine grid points are closer to the boundary of the object than the course grid points, and wherein a first distance between a first grid point of the fine grid points and a second grid point of the fine grid points is smaller than a second distance between a first grid point of the course grid points and a second grid point of the course grid points.

8. The method of claim 1, wherein the first graphical content is a frame of graphical content.

9. The method of claim 1, wherein generating the motion information comprises generating the motion information based on three dimensional vertex information from which the first graphical content is generated.

10. The method of claim 1, wherein generating the motion information comprises generating the motion information based on a comparison of the first graphical content to the second graphical content, and wherein the first graphical content is a current frame and the second graphical content is a previous frame.

11. The method of claim 10, wherein the current frame is frame N and the previous frame is frame N−1, and wherein N is a frame number.

12. The method of claim 1, wherein the first depth value corresponds to a foreground value and the second depth value corresponds to a background value.

13. The method of claim 1, wherein the first graphical content includes the plurality of pixels, the method further comprising:
generating a segmentation map that maps each respective pixel of the plurality of pixels to a respective object identifier of a plurality of object identifiers; and
determining, based on the segmentation map, where one or more object boundaries exist in the first graphical content.

14. The method of claim 13, further comprising:
applying a grid having a number of grid points to the motion information based on the determination of where the one or more object boundaries exist in the first graphical content; and
subsampling the motion information to generate the subsampled motion information based on the grid, and wherein each grid point of the number of grid points is a subsampling location.

15. The method of claim 14, wherein the number of grid points includes fine grid points and course grid points, wherein the fine grid points are closer to the one or more object boundaries than the course grid points, and wherein a first distance between a first grid point of the fine grid points and a second grid point of the fine grid points is smaller than a second distance between a first grid point of the course grid points and a second grid point of the course grid points.

16. A method of graphics processing at a first device, comprising:
providing, to a second device, first position information corresponding to a first orientation of the first device;
receiving, from the second device, encoded first graphical content generated based on the first position information;
receiving, from the second device, motion information, wherein the motion information is filtered based on second graphical content and the first graphical content, wherein the motion information is modified based on depth information including a plurality of pixels associated with the first graphical content and the second graphical content, including which pixels of the depth information correspond to a first depth value and which pixels of the depth information correspond to a second depth value, wherein the modified motion information includes a first number of motion vectors including a motion vector for each pixel of the plurality of pixels, wherein a second number of extrapolated motion vectors is received from the second device, wherein the second number of extrapolated motion vectors is based on the first number of motion vectors;
decoding the encoded first graphical content to generate decoded first graphical content; and
warping the decoded first graphical content based on the motion information.

17. The method of claim 16, wherein the decoded first graphical content includes the plurality of pixels, wherein the motion information includes a number of motion vectors, and wherein the number of motion vectors includes a respective motion vector for each respective pixel of the plurality of pixels.

18. The method of claim 16, wherein the decoded first graphical content includes a number of pixels, wherein the motion information includes a number of motion vectors, and wherein the number of motion vectors is less than the number of pixels.

19. The method of claim 16, further comprising:
upsampling the motion information, wherein warping the decoded first graphical content based on the motion information comprises warping the decoded first graphical content based on the upsampled motion information.

20. The method of claim 19, wherein the decoded first graphical content includes the plurality of pixels, wherein the upsampled motion information includes a number of motion vectors, and wherein the number of motion vectors includes a respective motion vector for each respective pixel of the plurality of pixels.

21. An apparatus for graphics processing at a first device, comprising:
a memory; and
at least one processor coupled to the memory and configured to:
receive, from a second device, first position information corresponding to a first orientation of the second device;
determine second position information corresponding to a predicted orientation of the second device;
generate first graphical content based on the first position information and second graphical content based on the second position information;
compare the first graphical content to the second graphical content, wherein to compare the first graphical content to the second graphical content, the at least one processor is further configured to:
generate depth information including a plurality of pixels associated with the first graphical content and the second graphical content, wherein the depth information includes a depth value for each pixel of the plurality of pixels; and
determine, based on the depth information, which pixels of the plurality of pixels correspond to a first depth value and which pixels of the plurality of pixels correspond to a second depth value;
generate motion information for warping the first graphical content;
modify the motion information based on the determination of which pixels correspond to the first depth value and which pixels correspond to the second depth value, wherein the modified motion information includes a first number of motion vectors including a motion vector for each pixel of the plurality of pixels, wherein to modify the motion information, the at least one processor is further configured to:
extrapolate the first number of motion vectors to generate a second number of extrapolated motion vectors; and
transmit, to the second device, the second number of extrapolated motion vectors;
filter the motion information based on the comparison of the first graphical content to the second graphical content;
encode the first graphical content; and
provide, to the second device, the motion information and the encoded first graphical content.

22. An apparatus for graphics processing at a first device, comprising:
a memory; and
at least one processor coupled to the memory and configured to:
provide, to a second device, first position information corresponding to a first orientation of the first device;
receive, from the second device, encoded first graphical content generated based on the first position information;
receive, from the second device, motion information, wherein the motion information is filtered based on second graphical content and the first graphical content, wherein the motion information is modified based on depth information including a plurality of pixels associated with the first graphical content and the second graphical content, including which pixels of the depth information correspond to a first depth value and which pixels of the depth information correspond to a second depth value, wherein the modified motion information includes a first number of motion vectors including a motion vector for each pixel of the plurality of pixels, wherein a second number of extrapolated motion vectors is received from the second device, wherein the second number of extrapolated motion vectors is based on the first number of motion vectors;

decode the encoded first graphical content to generate decoded first graphical content; and warp the decoded first graphical content based on the motion information.

\* \* \* \* \*